June 16, 1942.  L. C. KEMP  2,286,814
MANUFACTURE OF MOTOR FUEL
Filed Oct. 28, 1939
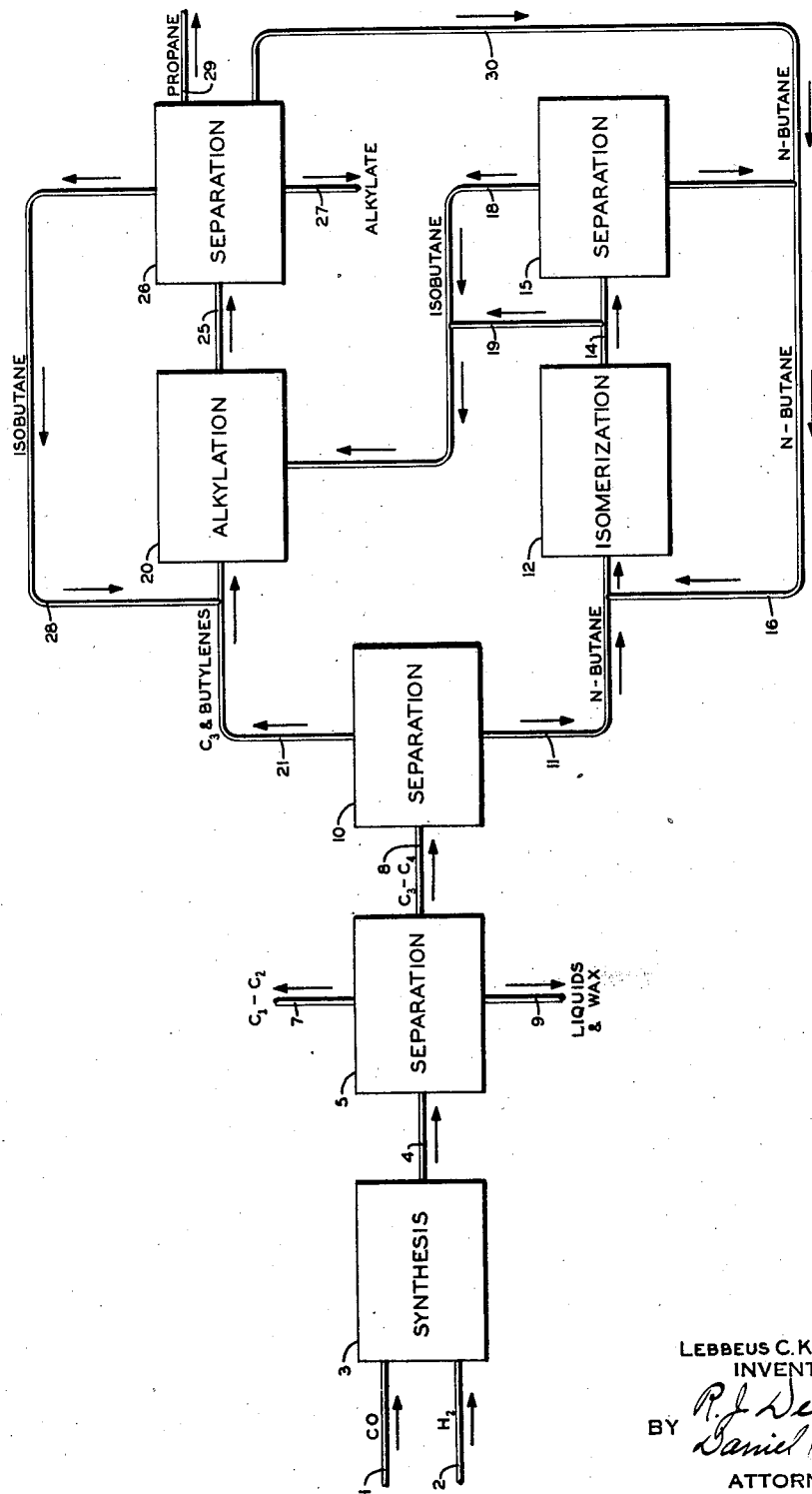
LEBBEUS C. KEMP
INVENTOR
BY
ATTORNEYS Patented June 16, 1942

2,286,814

UNITED STATES PATENT OFFICE 2,286,814

MANUFACTURE OF MOTOR FUEL

Lebbeus C. Kemp, Port Arthur, Tex., assignor, by mesne assignments, to The Texas Company, New York, N. Y., a corporation of Delaware Application October 28, 1939, Serial No. 301,739

10 Claims. (Cl. 196—10)

This invention relates to the manufacture of motor fuel and has to do more particularly with the production of motor fuel, such as gasoline, from mixtures of carbon monoxide and hydrogen.

In accordance with the invention, carbon monoxide and hydrogen are converted into a mixture of synthetic hydrocarbons. A normally gaseous hydrocarbon fraction predominating in hydrocarbons of two to five carbon atoms is separated from the reaction products and fractionated to produce a fraction rich in normal butane and a fraction containing butylenes and, if desired, lower boiling hydrocarbons, such as $C_3$ hydrocarbons. The normal butane is converted by isomerization into isobutane which is alkylated by said butylenes to form saturated branch chain hydrocarbons of gasoline boiling range.

In the synthesis of hydrocarbons from carbon monoxide and hydrogen, there is produced a hydrocarbon mixture ranging from methane to high boiling liquids and wax. The heavier constituents of the normally gaseous hydrocarbons, for example $C_4$ hydrocarbons or the $C_3$ and $C_4$ hydrocarbons, are particularly suitable for alkylation in that they contain a high percentage of propylene and butylene and are relatively free from isobutylene. The normal butane may be separated from such a mixture and subjected to isomerization to produce isobutane which may then be alkylated by the butylenes and propylene.

The invention will be more fully understood from the following description read in connection with the accompanying drawing which shows a flow diagram of one embodiment of the process of the invention.

Carbon monoxide and hydrogen from sources of supply (not shown, but are well known in the art) are introduced through the lines 1 and 2 respectively and subjected to a synthesis operation represented diagrammatically by the system designated by the numeral 3. The carbon monoxide and hydrogen should be charged in the volume ratio of about one part of carbon monoxide to two parts of hydrogen. This ratio may be varied somewhat and in general, on increasing the amount of carbon monoxide, higher unsaturation in the product usually results.

The synthesis operation is carried out by contacting the gases in suitable reactors with a catalyst comprising essentially cobalt and kieselguhr together with small amounts of thorium and magnesium oxides. The reaction is effected at temperatures of about 330° to 392° F. and under pressures ranging from about atmospheric up to about 140 pounds per square inch gauge.

The synthesis operation is well known in the art and produces a complex mixture of hydrocarbons, including both gaseous and liquid paraffins, olefins and solid paraffin wax. A typical product from such a synthesis consists of about 73% of condensable hydrocarbons of three carbon atoms and above, about 18.5% of uncondensable hydrocarbons of one and two carbon atoms and about 8.5% of wax. The condensable hydrocarbons comprise about 90% normally liquid hydrocarbons and about 10% $C_3$ and $C_4$ hydrocarbons. The $C_3$ and $C_4$ hydrocarbon fraction contains hydrocarbons of three and four carbon atoms in about equal amounts and has an unsaturation of about 50%.

The synthetic hydrocarbons are passed through the line 4 to a separation operation 5 wherein the $C_1$ and $C_2$ hydrocarbons are separated and discharged through the line 7, the $C_3$ and $C_4$ hydrocarbons through the line 8 and the liquids and wax through the line 9. This separation may be accomplished by well known means such as fractional distillation, solvent extraction, etc. In case it is desired to segregate a fraction comprising essentially $C_4$ hydrocarbons instead of a mixture of $C_3$ and $C_4$ hydrocarbons, such a fraction may be separated and discharged through the line 8 and the $C_3$ hydrocarbons either separated and discharged along with the $C_1$ and $C_2$ hydrocarbons through the line 7 or separated and discharged separately by means not shown.

The $C_3$ and $C_4$ hydrocarbon fraction is subjected to a further separation operation designated by the numeral 10 wherein the normal butane is separated from the lighter hydrocarbons comprising butylenes and $C_3$ hydrocarbons such as propane and propylene. The separation may be effected by fractional distillation or other suitable means.

The normal butane is passed through a line 11 to an isomerization operation 12 wherein the normal butane is partially converted into isobutane. The isomerziation is preferably carried out in the presence of an isomerization catalyst, such as anhydrous metallic halide, for example, aluminum chloride or aluminum bromide, promoted by the corresponding hydrogen halides, hydrogen chloride or hydrogen bromide. The isomerization may be effected in the liquid or vapor phase and at a temperature ranging from about 100° to 400° F. and preferably about 175° to 250° F. Under proper conditions, about 40 to 60% of the normal butane may be converted into isobutane in a single pass.

The mixture of isobutane and normal butane is transferred through the line 14 to a separation operation 15 wherein the isobutane may be separated from the normal butane which may be recycled through the line 16. The separation may conveniently be carried out by fractional distillation. The isobutane is passed through the line 18 to an alkylation operation 20. In case it is unnecessary or undesirable to separate the isobutane from the normal butane, the total isomerization products may be conducted through by-pass line 19 directly to the alkylation operation.

In the alkylation operation the isobutane is commingled with the butylenes and propylenes conducted thereto from the separation operation 10 through the line 21. The proportions of the materials introduced into the alkylation operation are such as to maintain an excess of isobutane over olefins. Suitable alkylation catalyst, such as sulfuric acid of 90 to 100% strength, aluminum chloride or hydrated boron trifluoride may be used. The operation is preferably carried out in the liquid phase at a temperature between about zero and 100° F., preferably about 60° to 90° F. The alkylation reaction comprises essentially the alkylation of the isobutane with the olefins to produce saturated branch chain hydrocarbons of gasoline boiling range.

The alkylation products are passed through the line 25 to separation operation 26 which may conveniently be one or more steps of fractionation. Normally liquid alkylate is separated and withdrawn through the line 27. The excess isobutane may be segregated and recycled through the line 28. In case $C_3$ hydrocarbons are treated, the residue therefrom will be principally propane, which may be discharged from the system through the line 29. Any normal butane which is not retained in the alkylate may be separated and recycled through the line 30 and line 16 to the isomerization operation.

As an example of the operation of the invention, a mixture containing hydrogen and carbon monoxide in the ratio of about 2:1, is subjected to conversion at about atmospheric pressure and at a temperature of about 350° F. in the presence of a catalyst consisting of about 30% cobalt, 60% kieselguhr, 5% thorium oxide and 5% magnesium oxide. About 85% of the carbon monoxide is converted into hydrocarbons showing about the following analysis:

| | Per cent | | Per cent |
|---|---|---|---|
| $C_1$ | 15.5 | $C_7$ | 7.3 |
| $C_2$ | 3.0 | $C_8$ | 6.3 |
| $C_3$ | 4.1 | $C_9$ | 5.1 |
| $C_4$ | 5.7 | $C_{10}$ | 4.6 |
| $C_5$ | 9.1 | $C_{11}$ to $C_{18}$ | 22.4 |
| $C_6$ | 8.7 | Wax (boiling above 608° F.) | 8.2 |

The $C_3$ and $C_4$ hydrocarbon fraction shows an olefin content of about 50% and comprises about equal amounts of $C_3$ and $C_4$ hydrocarbons. The $C_3$ and $C_4$ hydrocarbons comprise essentially propane, propylene, normal butylenes and normal butane. The $C_3$ and $C_4$ fraction is fractionated to separate the normal butane from the butylenes and $C_3$ hydrocarbons. The normal butane is isomerized in the liquid phase at about 220° F. in the presence of aluminum chloride and hydrogen chloride. A product containing the isobutane is mixed with the butylenes and $C_3$ hydrocarbons in such proportion that the ratio of isobutane to olefins is about 3:1. The mixture is contacted in the liquid phase with 96% sulfuric acid at about 60° F., whereby the isobutane is alkylated by the olefins. A gasoline fraction amounting to about 160% based on the olefins and having an antiknock value around 85 is obtained. The normally gaseous hydrocarbons are fractionated to separate the excess isobutane which is recycled, propane which is discharged from the system and normal butane which is returned to the isomerization operation.

Obviously many modifications and variations of the invention, as hereinbefore set forth, may be made without departing from the spirit and scope thereof, and therefore only such limitations should be imposed as are indicated in the appended claims.

I claim:

1. A process for the manufacture of motor fuel which comprises converting a mixture of carbon monoxide and hydrogen into synthetic hydrocarbons in the presence of a catalyst consisting essentially of cobalt, kieselguhr and small amounts of thorium and magnesium oxides at a temperature of about 330 to 392° F. and under low pressure, thereby obtaining a synthetic hydrocarbon mixture composed mainly of hydrocarbons having from 1 to about 10 carbon atoms per molecule, the $C_3$—$C_4$ fraction thereof consisting essentially of aliphatic hydrocarbons composed largely of olefins and relatively free from isobutylene, separating from the reaction products a normally gaseous hydrocarbon fraction predominating in hydrocarbons between 2 and 5 carbon atoms, separating said fraction into a fraction rich in normal butane and a fraction rich in butylenes, converting by isomerization said normal butane into isobutane, alkylating the isobutane with said butylenes and recovering from the alkylation product saturated branch chain hydrocarbons of gasoline boiling range.

2. A process for the manufacture of motor fuel which comprises converting a mixture of carbon monoxide and hydrogen into synthetic hydrocarbons in the presence of a catalyst consisting essentially of cobalt, kieselguhr and small amounts of thorium and magnesium oxides at a temperature of about 330 to 392° F. and under low pressure, thereby obtaining a synthetic hydrocarbon mixture composed mainly of hydrocarbons having from 1 to about 10 carbon atoms per molecule, the $C_3$—$C_4$ fraction thereof consisting essentially of aliphatic hydrocarbons composed largely of olefins and relatively free from isobutylene, separating from the reaction products a light gaseous fraction predominating in hydrocarbons of less than 3 carbon atoms and a heavier gaseous fraction predominating in hydrocarbons of 3 and 4 carbon atoms, fractionating the heavier fractions to separate the normal butane from the other hydrocarbons including butylenes, propane and propylene, converting by isomerization the normal butane to isobutane, alkylating the isobutane with the butylenes and propylene and recovering from the alkylation products saturated branch chain hydrocarbons of gasoline boiling range.

3. A process for the manufacture of motor fuel which comprises converting a mixture of carbon monoxide and hydrogen into synthetic hydrocarbons in the presence of a catalyst consisting essentially of cobalt, kieselguhr and small amounts of thorium and magnesium oxides at a temperature of about 330 to 392° F. and under low pressure, thereby obtaining a synthetic hydrocarbon mixture composed mainly of hydrocarbons having from 1 to about 10 carbon atoms per molecule, the $C_3$—$C_4$ fraction thereof consisting essentially of aliphatic hydrocarbons composed largely of olefins and relatively free from isobutylene, separating from the reaction products a light gaseous fraction predominating in hydrocarbons of less than 3 carbon atoms and a heavier gaseous fraction predominating in hydrocarbons of 3 and 4 carbon atoms, fractionating the heavier fraction to separate the normal butane from the other hydrocarbons including butylenes, propane and propylene, partially converting by isomerization the normal butane to isobutane, separating the isobutane from unconverted normal butane, recycling the unconverted normal butane, alkylating the isobutane with the butylenes and propylene and recovering from the alkylation products high antiknock hydrocarbons of gasoline boiling range.

4. A process for the manufacture of motor fuel which comprises converting a mixture of carbon monoxide and hydrogen into synthetic hydrocarbons in the presence of a catalyst consisting essentially of cobalt, kieselguhr and small amounts of thorium and magnesium oxides at a temperature of about 330 to 392° F. and under low pressure, thereby obtaining a synthetic hydrocarbon mixture composed mainly of hydrocarbons having from 1 to about 10 carbon atoms per molecule, the $C_3$—$C_4$ fraction thereof consisting essentially of aliphatic hydrocarbons composed largely of olefins and relatively free from isobutylene, separating from the reaction products a light gaseous fraction predominating in hydrocarbons of less than 3 carbon atoms and a heavier gaseous fraction predominating in hydrocarbons of 3 and 4 carbon atoms, fractionating the heavier fraction to separate the normal butane from the other hydrocarbons including butylenes, propane and propylene, partially converting by isomerization the normal butane to isobutane, commingling the isomerization products with said butylenes and propylene, contacting the mixture with an alkylation catalyst under alkylating conditions while maintaining an excess of isobutane whereby the isobutane is alkylated with the butylenes and propylene to form saturated branch chain hydrocarbons of gasoline boiling range, separating from the alkylation products a normally liquid alkylate and recycling the excess isobutane to the alkylation operation.

5. A process for the manufacture of motor fuel which comprises converting a mixture of carbon monoxide and hydrogen into synthetic hydrocarbons in the presence of a catalyst consisting essentially of cobalt, kieselguhr and small amounts of thorium and magnesium oxides at a temperature of about 330 to 392° F. and under low pressure, thereby obtaining a synthetic hydrocarbon mixture composed mainly of hydrocarbons having from 1 to about 10 carbon atoms per molecule, the $C_3$—$C_4$ fraction thereof consisting essentially of aliphatic hydrocarbons composed largely of olefins and relatively free from isobutylene, separating from the reaction products a light gaseous fraction predominating in hydrocarbons of less than 3 carbon atoms and a heavier gaseous fraction predominating in hydrocarbons of 3 and 4 carbon atoms, fractionating the heavier fraction to separate the normal butane from the other hydrocarbons including butylenes, propane and propylene, partially converting by isomerization the normal butane to isobutane, commingling the isomerization products with said butylenes and propylene, contacting the mixture with an alkylation catalyst under alkylating conditions while maintaining an excess of isobutane whereby the isobutane is alkylated with the butylenes and propylene to form saturated branch chain hydrocarbons of gasoline boiling range, separating from the alkylation products a normally liquid alkylate, normal butane and excess isobutane, recycling the excess isobutane to the alkylation operation and returning the normal butane to the isomerization operation.

6. A process according to claim 5 in which the propane is separated from the alkylation products and discharged from the system.

7. In a process for the manufacture of high antiknock motor fuel hydrocarbons, the steps which comprise catalytically converting a mixture of carbon monoxide and hydrogen to a synthetic hydrocarbon mixture composed mainly of hydrocarbons having from 1 to about 10 carbon atoms per molecule, the $C_3$—$C_4$ fraction of which consists essentially of aliphatic hydrocarbons composed largely of olefins and relatively free from isobutylene, separating from said synthetic mixture a fraction rich in normal butane and another fraction rich in normal butylenes, subjecting said butane rich fraction to isomerization so as to form isobutane, separately reacting the resulting isobutane with said butylene rich fraction by contact with an alkylation catalyst maintained under alkylating conditions and in the substantial absence of isobutylene, whereby isobutane is alkylated to produce normally liquid saturated hydrocarbons having a high antiknock value and boiling within the range for motor fuel.

8. In a process for the manufacture of high antiknock motor fuel hydrocarbons, the steps which comprise catalytically converting a mixture of carbon monoxide and hydrogen to a synthetic hydrocarbon mixture composed mainly of hydrocarbons having from 1 to about 10 carbon atoms per molecule, the $C_3$—$C_4$ fraction of which consists essentially of aliphatic hydrocarbons composed largely of olefins and relatively free from isobutylene, separating from said synthetic mixture a fraction rich in normal butane and another fraction rich in normal butylenes, subjecting said butane rich fraction to isomerization so as to form isobutane, separately reacting the resulting isobutane with said butylene rich fraction by contact with concentrated sulfuric acid maintained under alkylating conditions and in the substantial absence of isobutylene, whereby isobutane is alkylated to produce normally liquid saturated hydrocarbons having a high antiknock value and boiling within the range for motor fuel.

9. In a process for the manufacture of high antiknock motor fuel hydrocarbons, the steps which comprise catalytically converting a mixture of carbon monoxide and hydrogen to a synthetic hydrocarbon mixture composed mainly of hydrocarbons having from 1 to 10 carbon atoms per molecule, the $C_3$—$C_4$ fraction of which consists essentially of aliphatic hydrocarbons composed largely of olefins and relatively free from isobutylene, separating from said synthetic mixture a normally gaseous fraction rich in normal butane and another normally gaseous fraction rich in normal olefins, subjecting said butane rich fraction to isomerization so as to form isobutane, separately reacting the resulting isobutane with said olefin rich fraction by contact with concentrated sulfuric acid maintained under alkylating conditions and in the substantial absence of isobutylene, whereby isobutane is alkylated to produce normally liquid saturated hydrocarbons having a high antiknock value and boiling within the range for motor fuel.

10. In a process for the manufacture of high antiknock motor fuel hydrocarbons, the steps which comprise catalytically converting a mixture of carbon monoxide and hydrogen to a synthetic hydrocarbon mixture composed mainly of hydrocarbons having from 1 to about 10 carbon atoms per molecule, the $C_3$—$C_4$ fraction of which consists essentially of aliphatic hydrocarbons composed largely of olefins and relatively free from isobutylene, separating said $C_3$—$C_4$ fraction from the synthetic mixture, separating normal butane from said $C_3$—$C_4$ fraction, subjecting said normal butane to isomerization so as to form isobutane, separately reacting the resulting isobutane with olefinic constituents of said $C_3$—$C_4$ fraction by contact with concentrated sulfuric acid maintained under alkylating conditions and in the substantial absence of isobutylene, whereby isobutane is alkylated to produce normally liquid saturated hydrocarbons having a high antiknock value and boiling within the range for motor fuel.

LEBBEUS C. KEMP.